United States Patent
Newhouse et al.

(10) Patent No.: US 11,708,053 B2
(45) Date of Patent: Jul. 25, 2023

(54) ROTATING BLADE MECHANISM FOR CLEANING CYLINDRICAL SENSORS

(71) Applicant: GM Cruise Holdings LLC, San Francisco, CA (US)

(72) Inventors: Wesley Newhouse, San Francisco, CA (US); Michael Shagam, San Francisco, CA (US); Isaac Brown, San Francisco, CA (US)

(73) Assignee: GM Cruise Holdings LLC., San Francisco, CA (US)

( * ) Notice: Subject to any disclaimer, the term of this patent is extended or adjusted under 35 U.S.C. 154(b) by 0 days.

(21) Appl. No.: 16/992,268

(22) Filed: Aug. 13, 2020

(65) Prior Publication Data

US 2022/0048477 A1    Feb. 17, 2022

(51) Int. Cl.
   *B60S 1/54*    (2006.01)
   *B60S 1/34*    (2006.01)

(52) U.S. Cl.
   CPC ............ *B60S 1/546* (2013.01); *B60S 1/3415* (2013.01); *B60S 1/542* (2013.01)

(58) Field of Classification Search
   CPC ........ B60S 1/0848; B60S 1/524; B60S 1/546; B60S 1/548; B60S 1/38; B60S 2001/3836; B60S 2001/2001; B60S 2001/3827; B60S 1/0896; B60S 1/486; B60S 1/542; B60S 1/566; B60S 1/3415; G01S 2007/4977; G02B 27/0006
   USPC ............ 15/250.001, 250.01, 250.04, 250.48, 15/250.29; 359/507, 509
   See application file for complete search history.

(56) References Cited

U.S. PATENT DOCUMENTS

| | | | |
|---|---|---|---|
| 10,589,726 B1* | 3/2020 | Ingram | B60S 1/28 |
| 11,084,464 B2* | 8/2021 | Velasco | B60S 1/486 |
| 2008/0072393 A1* | 3/2008 | Tanaka | A47L 1/02 |
| | | | 15/250.03 |
| 2016/0244028 A1 | 8/2016 | Wakatsuki | |
| 2018/0134259 A1* | 5/2018 | Wachter | G01S 7/4813 |
| 2018/0215350 A1* | 8/2018 | Herrmann | G02B 27/0006 |
| 2019/0193688 A1 | 6/2019 | Lombrozo | |
| 2019/0359176 A1* | 11/2019 | Albuquerque | B60S 1/566 |
| 2020/0033592 A1 | 1/2020 | Crespo et al. | |

FOREIGN PATENT DOCUMENTS

KR    20200089587 A    7/2020

OTHER PUBLICATIONS

International Preliminary Report on Patentability dated Feb. 7, 2023, application # PCT/US21/42494.

* cited by examiner

*Primary Examiner* — Thomas Raymond Rodgers
(74) *Attorney, Agent, or Firm* — Polsinelli PC (57) ABSTRACT

The subject disclosure relates to features that facilitate the automatic cleaning of optical sensors and in particular Light Detection and Ranging (LiDAR) sensors used in autonomous vehicle deployments. In some aspects, the disclosed technology includes a sensor cleaning apparatus having a housing, wherein the housing is configured to be rotatably coupled to an optical sensor, a wiper blade coupled to the housing, wherein the wiper blade is disposed at a downward angle relative to a top-surface of the optical sensor, and one or more nozzles disposed within the wiper blade, wherein the nozzles are configured to apply compressed gas to a surface of the optical sensor.

20 Claims, 6 Drawing Sheets

ROTATING BLADE MECHANISM FOR CLEANING CYLINDRICAL SENSORS

BACKGROUND

1. Technical Field

The subject technology provides solutions for maintaining sensor performance and in particular, for cleaning cylindrical sensors mounted on autonomous vehicles (AVs).

2. Introduction

Autonomous vehicles (AVs) are vehicles having computers and control systems that perform driving and navigation tasks that are conventionally performed by a human driver. As AV technologies continue to advance, AVs will be required to perform many of the functions that are conventionally performed by human drivers, such as performing navigation and routing tasks necessary to provide a safe and efficient ride service. Such tasks may require the collection and processing of large quantities of data using various sensor types, including but not limited to cameras and/or Light Detection and Ranging (LiDAR) sensors disposed on the AV.

BRIEF DESCRIPTION OF THE DRAWINGS

Certain features of the subject technology are set forth in the appended claims. However, the accompanying drawings, which are included to provide further understanding, illustrate disclosed aspects and together with the description serve to explain the principles of the subject technology. In the drawings:

DETAILED DESCRIPTION

The detailed description set forth below is intended as a description of various configurations of the subject technology and is not intended to represent the only configurations in which the subject technology can be practiced. The appended drawings are incorporated herein and constitute a part of the detailed description. The detailed description includes specific details for the purpose of providing a more thorough understanding of the subject technology. However, it will be clear and apparent that the subject technology is not limited to the specific details set forth herein and may be practiced without these details. In some instances, structures and components are shown in block diagram form in order to avoid obscuring the concepts of the subject technology.

As described herein, one aspect of the present technology is the gathering and use of data available from various sources to improve quality and experience. The present disclosure contemplates that in some instances, this gathered data may include personal information. The present disclosure contemplates that the entities involved with such personal information respect and value privacy policies and practices.

Autonomous vehicle (AV) sensors are needed to collect environmental data and measurements needed for to vehicle navigation and routing decisions. However, in the course of operation, sensor efficacy can be degraded by environmental contaminants such as dirt or moisture. For example, Light Detection and Ranging (LiDAR) sensors operate best when their surfaces are free from optical obstructions, such as those caused by dust or moisture.

The cleaning of optical surfaces poses many challenges. For example, fixed nozzle cleaning requires nozzles with high flow rates and/or pressures as cylindrical sensors, such as LiDAR sensors, that often have a large optical surfaces with wide fields of view. In addition, cylindrical sensors can sense in all directions, requiring numerous high flow nozzles to provide full, unobstructed, cleaning coverage. Such requirements mean that typically large pressure and flow rate requirements for the corresponding systems that provide compressed air and/or liquid (via nozzles,) making the cleaning solution overly costly and complex.

Conventional wiper blade solutions are not ideal for AV purposes. For example, wiper blade solutions can cause excessive wear on optical surfaces compromising sensor performance. Wiper blades also have poor service life and reliability. Additionally, linear/oscillating wipers do not work well on cylindrical surfaces. A straight (parallel to the cylinder axis) rotating wiper blade does not remove debris— it simply smears it around the optical surface, resulting in poor image quality.

Aspects of the disclosed technology address the foregoing limitations of conventional sensor cleaning solutions by providing a rotating (non-contacting) air-blade composed of one or more integrated nozzles. Because the wiper blade does not contact the sensor's optical surface, the smearing of debris and possible scratching delicate optical surfaces is avoided. Rotation of the wiper blade housing that contains the one or more nozzles reduces the necessary nozzle count by scanning a single nozzle (or integrated array) over a larger area. Additionally, the close proximity between the nozzles and the optical surface serves to reduce flow demands, thereby improving cleaning efficacy.

Although the sensor cleaning solutions discussed herein make reference to cylindrical sensors operated in an autonomous vehicle (AV) context, it is understood that other implementations are contemplated. For example, cylindrical sensors and the cleaning systems and methods disclosed herein may be deployed on non-autonomous vehicles, or on vehicles of various other types, (e.g., aircraft and/or watercraft, etc.), and/or in virtually any other context, without departing from the scope of the disclosed technology. As such, the disclosed examples are understood to be illustrative of some embodiments of the disclosed technology, but do not represent the only modes in which the technology may be practiced.

Figure 1:
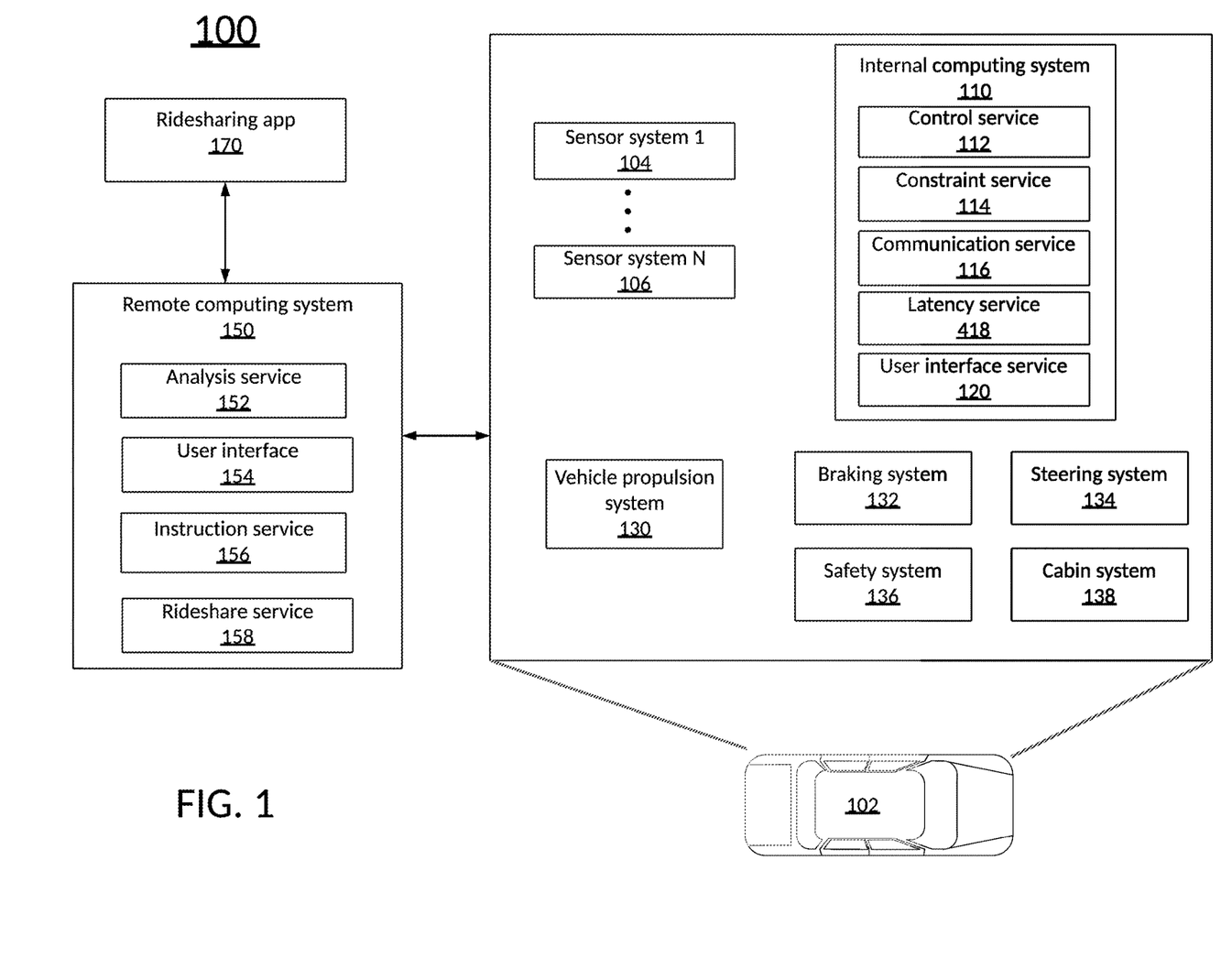
FIG. 1 illustrates an example system environment that can be used to facilitate AV navigation and routing operations, according to some aspects of the disclosed technology.

FIG. 1 illustrates an example system environment 100 that can be used to facilitate AV dispatch and operations, according to some aspects of the disclosed technology. Autonomous vehicle 102 can navigate about roadways without a human driver based upon sensor signals output by sensor systems 104-106 of autonomous vehicle 102.

Autonomous vehicle 102 includes a plurality of sensor systems 104-106 (a first sensor system 104 through an Nth sensor system 106). Sensor systems 104-106 are of different types and are arranged about the autonomous vehicle 102. For example, first sensor system 104 may be a camera sensor system and the Nth sensor system 106 may be a Light Detection and Ranging (LIDAR) sensor system. Other exemplary sensor systems include radio detection and ranging (RADAR) sensor systems, Electromagnetic Detection and Ranging (EmDAR) sensor systems, Sound Navigation and Ranging (SONAR) sensor systems, Sound Detection and Ranging (SODAR) sensor systems, Global Navigation Satellite System (GNSS) receiver systems such as Global Positioning System (GPS) receiver systems, accelerometers, gyroscopes, inertial measurement units (IMU), infrared sensor systems, laser rangefinder systems, ultrasonic sensor systems, infrasonic sensor systems, microphones, or a combination thereof. While four sensors 180 are illustrated coupled to the autonomous vehicle 102, it is understood that more or fewer sensors may be coupled to the autonomous vehicle 102.

Autonomous vehicle 102 further includes several mechanical systems that are used to effectuate appropriate motion of the autonomous vehicle 102. For instance, the mechanical systems can include but are not limited to, vehicle propulsion system 130, braking system 132, and steering system 134. Vehicle propulsion system 130 may include an electric motor, an internal combustion engine, or both. The braking system 132 can include an engine brake, brake pads, actuators, and/or any other suitable componentry that is configured to assist in decelerating autonomous vehicle 102. In some cases, braking system 132 may charge a battery of the vehicle through regenerative braking. Steering system 134 includes suitable componentry that is configured to control the direction of movement of the autonomous vehicle 102 during navigation. Autonomous vehicle 102 further includes a safety system 136 that can include various lights and signal indicators, parking brake, airbags, etc. Autonomous vehicle 102 further includes a cabin system 138 that can include cabin temperature control systems, in-cabin entertainment systems, etc.

Autonomous vehicle 102 additionally comprises an internal computing system 110 that is in communication with sensor systems 180 and systems 130, 132, 134, 136, and 138. Internal computing system 110 includes at least one processor and at least one memory having computer-executable instructions that are executed by the processor. The computer-executable instructions can make up one or more services responsible for controlling autonomous vehicle 102, communicating with remote computing system 150, receiving inputs from passengers or human co-pilots, logging metrics regarding data collected by sensor systems 180 and human co-pilots, etc.

Internal computing system 110 can include a control service 112 that is configured to control operation of vehicle propulsion system 130, braking system 132, steering system 134, safety system 136, and cabin system 138. Control service 112 receives sensor signals from sensor systems 180 as well communicates with other services of internal computing system 110 to effectuate operation of autonomous vehicle 102. In some embodiments, control service 112 may carry out operations in concert one or more other systems of autonomous vehicle 102. Internal computing system 110 can also include constraint service 114 to facilitate safe propulsion of autonomous vehicle 102. Constraint service 116 includes instructions for activating a constraint based on a rule-based restriction upon operation of autonomous vehicle 102. For example, the constraint may be a restriction upon navigation that is activated in accordance with protocols configured to avoid occupying the same space as other objects, abide by traffic laws, circumvent avoidance areas, etc. In some embodiments, the constraint service can be part of control service 112.

The internal computing system 110 can also include communication service 116. The communication service 116 can include both software and hardware elements for transmitting and receiving signals from/to the remote computing system 150. Communication service 116 is configured to transmit information wirelessly over a network, for example, through an antenna array that provides personal cellular (long-term evolution (LTE), 3G, 4G, 5G, etc.) communication.

Internal computing system 110 can also include latency service 118. Latency service 118 can utilize timestamps on communications to and from remote computing system 150 to determine if a communication has been received from the remote computing system 150 in time to be useful. For example, when a service of the internal computing system 110 requests feedback from remote computing system 150 on a time-sensitive process, the latency service 118 can determine if a response was timely received from remote computing system 150 as information can quickly become too stale to be actionable. When the latency service 118 determines that a response has not been received within a threshold, latency service 118 can enable other systems of autonomous vehicle 102 or a passenger to make necessary decisions or to provide the needed feedback.

Internal computing system 110 can also include a user interface service 120 that can communicate with cabin system 138 in order to provide information or receive information to a human co-pilot or human passenger. In some embodiments, a human co-pilot or human passenger may be required to evaluate and override a constraint from constraint service 114, or the human co-pilot or human passenger may wish to provide an instruction to the autonomous vehicle 102 regarding destinations, requested routes, or other requested operations.

As described above, the remote computing system 150 is configured to send/receive a signal from the autonomous vehicle 140 regarding reporting data for training and evaluating machine learning algorithms, requesting assistance from remote computing system 150 or a human operator via the remote computing system 150, software service updates, rideshare pickup and drop off instructions, etc.

Remote computing system 150 includes an analysis service 152 that is configured to receive data from autonomous vehicle 102 and analyze the data to train or evaluate machine learning algorithms for operating the autonomous vehicle 102. The analysis service 152 can also perform analysis pertaining to data associated with one or more errors or constraints reported by autonomous vehicle 102. Remote computing system 150 can also include a user interface service 154 configured to present metrics, video, pictures, sounds reported from the autonomous vehicle 102 to an operator of remote computing system 150. User interface service 154 can further receive input instructions from an operator that can be sent to the autonomous vehicle 102.

Remote computing system 150 can also include an instruction service 156 for sending instructions regarding the operation of the autonomous vehicle 102. For example, in response to an output of the analysis service 152 or user interface service 154, instructions service 156 can prepare instructions to one or more services of the autonomous vehicle 102 or a co-pilot or passenger of the autonomous vehicle 102. Remote computing system 150 can also include rideshare service 158 configured to interact with ridesharing applications 170 operating on (potential) passenger computing devices. The rideshare service 158 can receive requests to be picked up or dropped off from passenger ridesharing app 170 and can dispatch autonomous vehicle 102 for the trip. The rideshare service 158 can also act as an intermediary between the ridesharing app 170 and the autonomous vehicle wherein a passenger might provide instructions to the autonomous vehicle to 102 go around an obstacle, change routes, honk the horn, etc. Remote computing system 150 can, in some cases, include at least one computing system 150 as illustrated in or discussed with respect to FIG. 5, or may include at least a subset of the components illustrated in FIG. 5 or discussed with respect to computing system 150.

Figure 2:
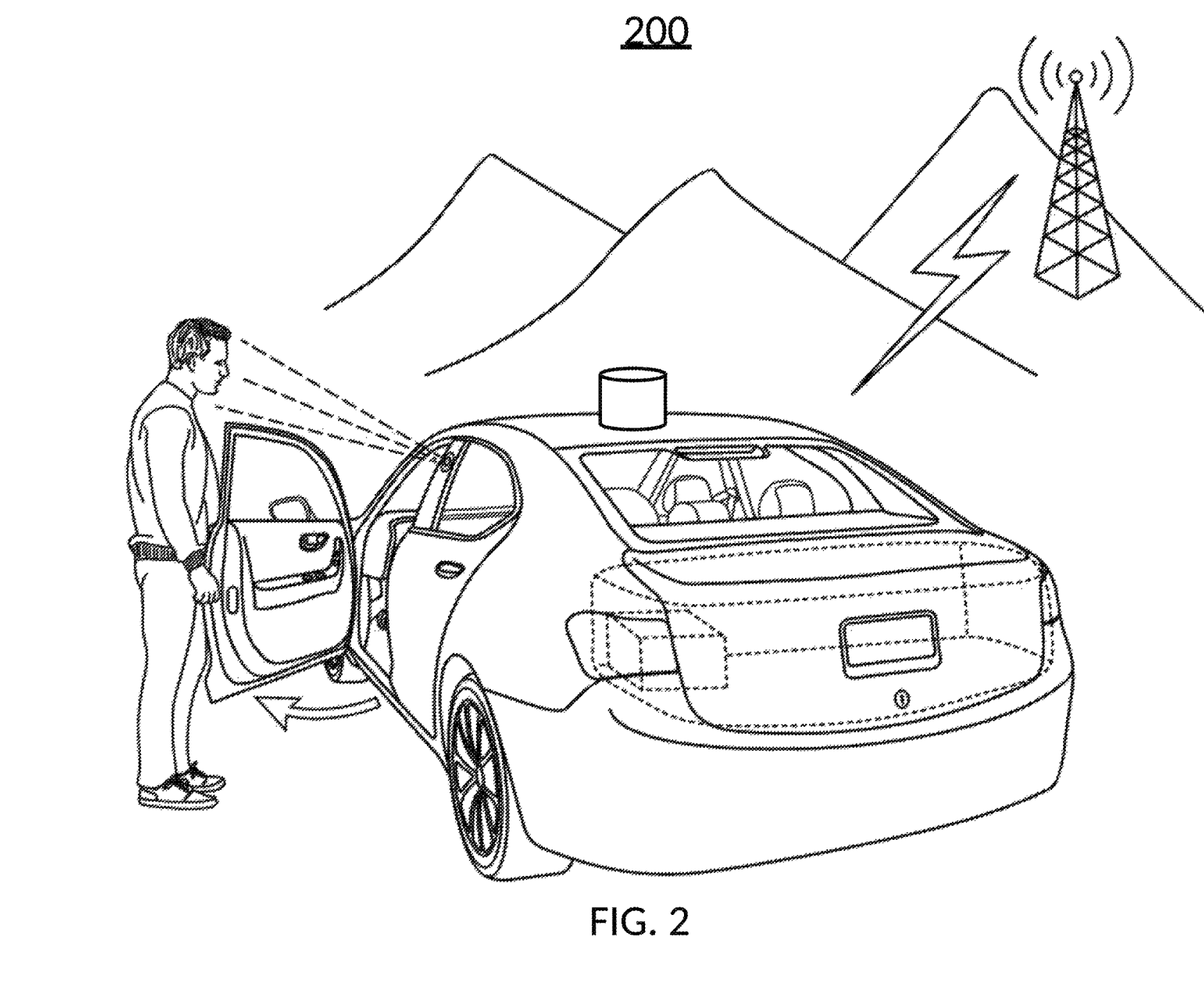
FIG. 2 illustrates an example of an autonomous vehicle (AV) environment in which a sensor cleaning apparatus of the disclosed technology can be implemented.

FIG. 2 illustrates an example of an autonomous vehicle (AV) environment 200 in which a sensor cleaning apparatus of the disclosed technology can be implemented. Environment 200 includes AV 202 that utilizes cylindrical sensor 206. Data collected by sensor 206 during operation of AV 202 can be processed by compute unit 204, for example, to enable navigation and routing functions for AV 102 that are needed to provide a ride service to one or more users/riders, e.g., rider 210. In some aspects, navigation and routing functions can also be facilitated through signals provided by one or more remote systems (e.g. a dispatch system) using a wireless communication channel, for example, provided by a wireless access point 208.

In operation, sensor 206 can be an optical sensor, such as a Light Detection and Ranging (LiDAR) sensor that is configured to transmit and receive light through an optical surface. During operation of sensor 206, the optical surface may become occluded, for example, due to the settling of dust, dirt, moisture, or other debris that can impede the transmission of light. In some aspects, a self-cleaning sensor system of the disclosed technology can be deployed to clean/maintain the optical sensor. Depending on the desired implementation, sensor cleaning may be performed continuously, periodically, or performed at discrete times, for example, in response to specific indications that the sensor's optical surface needs cleaning. Further details regarding the mechanical operation of a self-cleaning system are provided with respect to FIG. 3, below.

Figure 3:
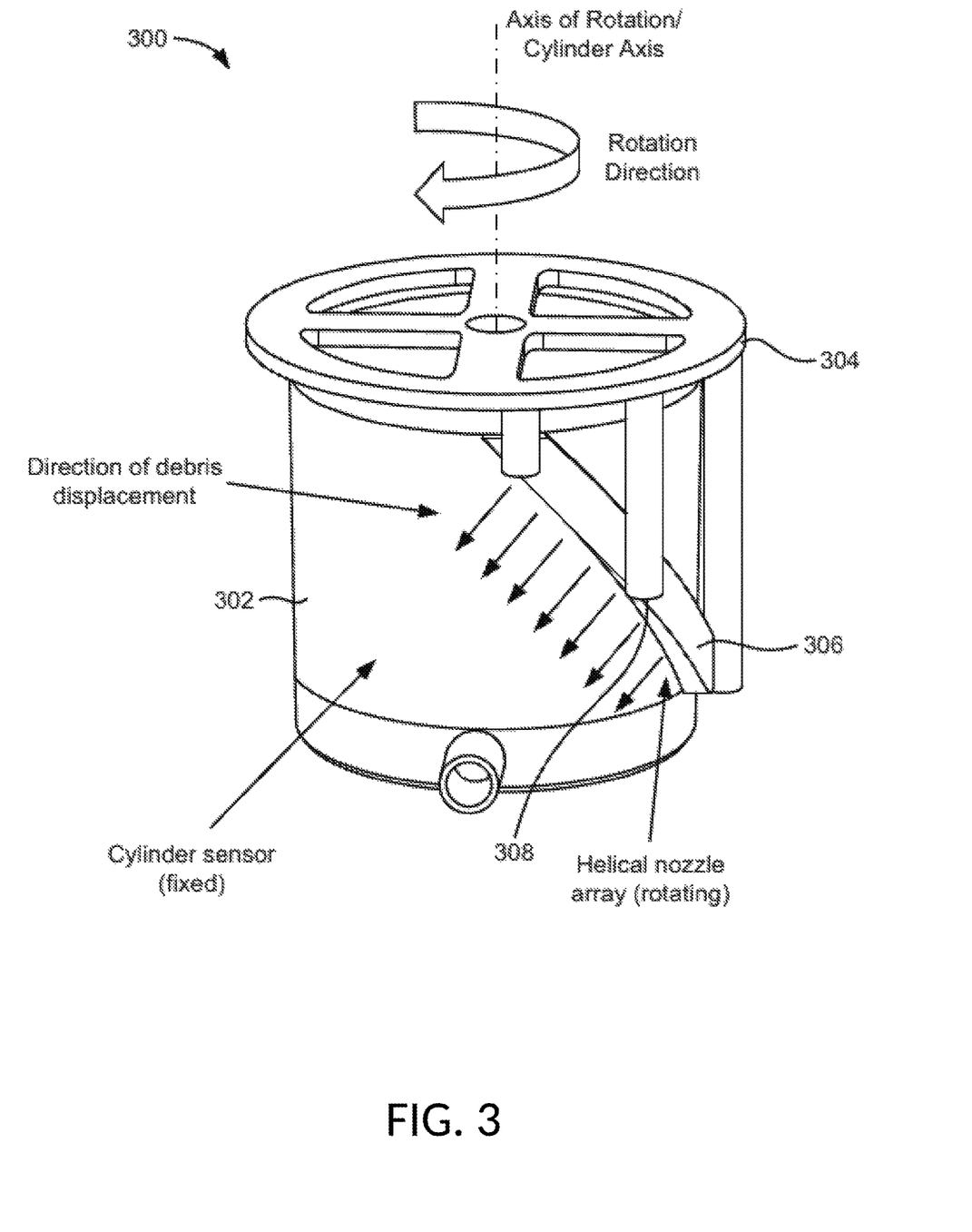
FIG. 3 illustrates an example of self-cleaning sensor, according to some aspects of the disclosed technology.

In particular, FIG. 3 illustrates an example of self-cleaning sensor 300, according to some aspects of the disclosed technology. Sensor 300 includes a cylindrical sensor 302 (e.g., a LiDAR sensor), a wiper housing 304, and a wiper blade 306. As illustrated in the example of FIG. 3, the wiper assembly includes a wiper blade 306 that is affixed to housing 304 such that blade 306 is positioned in a downward angle with respect to a top-surface of cylindrical sensor 302. As illustrated, the housing 304 can be affixed to a top-surface of sensor 302, for example, so that the attachment point does not occlude an optical surface of sensor 302. Although the example illustrated in FIG. 3 depicts a self-cleaning sensor 300 with a single blade 306, it is understood that two or more blades may be implemented, without departing from the scope of the disclosed technology.

In operation, housing 304 is configured to rotate so that blade 306 is scanned over an optical surface of sensor 302. Depending on the desired implementation, blade 306 can be configured to contact optical surface 302 or configured rotate about optical surface 302, without physical contact. Because sensor 302 may implement a light scanning operation, the angular speed of wiper 306 can be configured based on the sensor's scanning rate so that wiper 306 does not obstruct sensor operation. By way of example, sensor 302 can be a LiDAR sensor with a scanning rate of approximately 10 Hz. As such, the wiper assembly, i.e., wiper housing 304 and blade 306, can also rotate about optical sensor 302 at a frequency of approximately 10 Hz. By matching the rotational frequency while placing wiper blade 306 away from the path of the underlying scanning lasers (e.g., out of phase), sensor cleaning can be performed without interfering with operation of sensor 302. Depending on the desired implementation, ensuring that wiper 306 does not obstruct sensor operation can be performed in different ways. For example, housing 304 may be affixed to the same driver/motor that controls the laser scanning of the LiDAR sensor, for example, such that the rotational speeds are matched. Alternatively, housing 304 may be controlled by a separate motor that is calibrated to match the scanning rate of sensor 302. It is understood that different scanning rates for the sensor and/or wiper blade 306 may be used, without departing from the scope of the disclosed technology.

In some implementation, scanning of wiper blade 306 may not be continuous. In such approaches, wiper blade 306, when stationary can be positioned in an unused field of view (FOV) region of an optical surface of sensor 302. By way of example, placement of optical sensor 302 may be such that only a fraction of the radial view angle (e.g., 250 degrees) are used for scanning. As such, wiper blade 306 can be parked in the unused portion of the FOV of sensor 302.

Removal of dirt, moisture and/or other debris, etc., from an optical surface of sensor 302 is facilitated by the use of one or more nozzles 308 that are disposed within wiper blade 306. In some approaches, nozzles 308 are configured to apply compressed gas (air) to the optical surface. Because the nozzles are arranged in a helical array that points in a downward direction relative to the top-surface of sensor 302, debris is pushed down without smearing the optical surface. Additionally, by placing nozzles 308 in close proximity to, but without contact with, the optical surface, the flow rate of the compressed gas can be reduced as opposed to cleaning nozzles that are disposed at a greater distance. Additionally, by rotating/scanning nozzles 308 around the optical surface via rotation of wiper blade 306, fewer nozzles may be implemented for example, relative to fixed-array implementations, while still providing an effective sensor cleaning solution.

In other aspects, nozzles 308 can be configured to apply a liquid cleaning agent, such as water or a solvent-based cleaning fluid (e.g., ethanol or methanol, etc.), to a surface of the optical sensor. Additionally, in some implementations, the leading edge of wiper blade 306 may be configured to contact the optical surface of the sensor, thereby providing mechanical force to facilitate the clearance of debris.

Figure 4A:
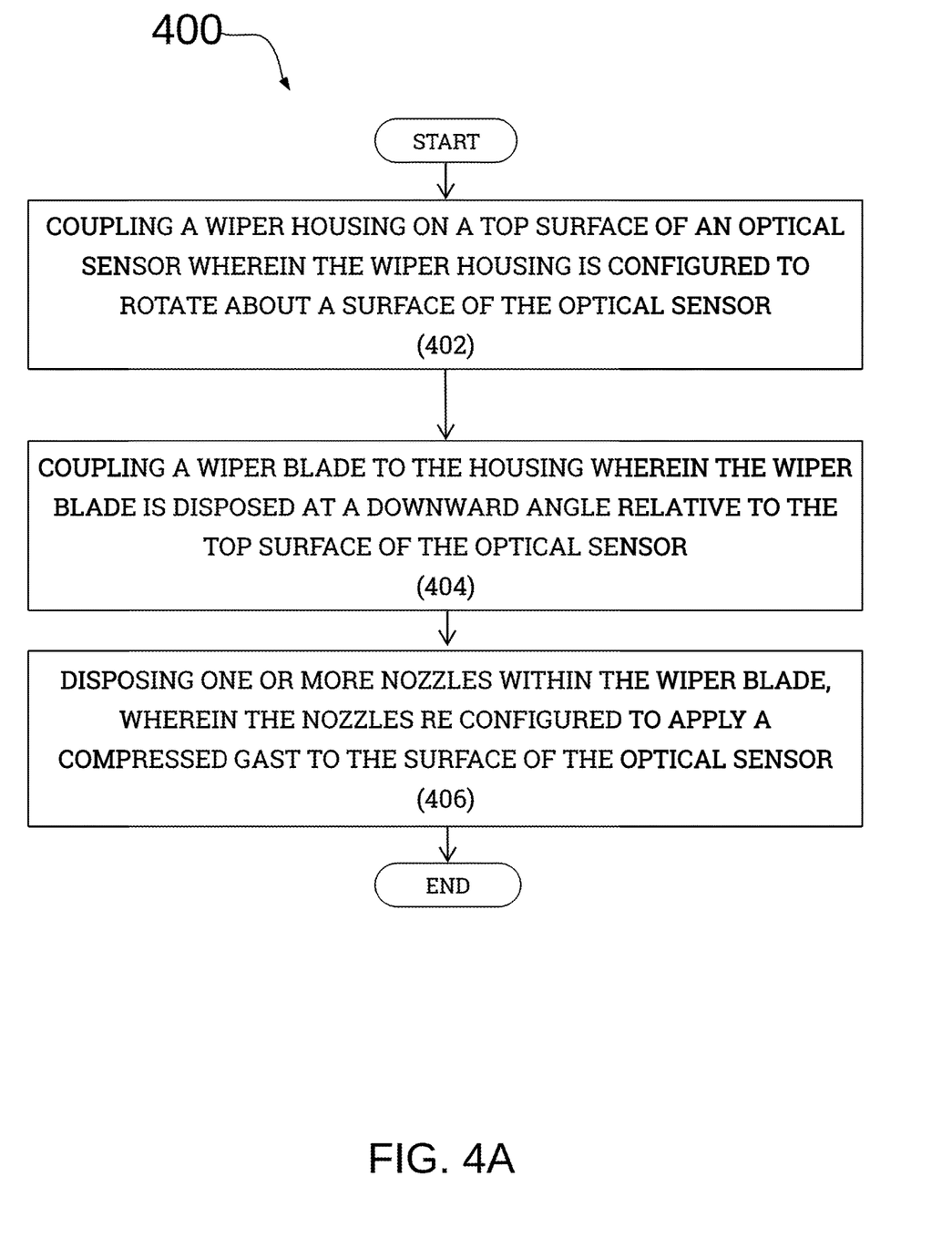
FIG. 4A illustrates steps of an example process for constructing a self-cleaning sensor, according to some aspects of the disclosed technology.

FIG. 4A illustrates steps of an example process 400 for constructing a self-cleaning sensor, according to some aspects of the disclosed technology. Process 400 begins with step 402 in which a cleaning apparatus housing (wiper housing) is coupled to a cylindrical sensor. In some aspects, the cylindrical sensor may be an optical sensor, such as a LiDAR sensor. However, other types of cylindrical sensors are contemplated, without departing from the scope of the disclosed technology.

Coupling between the cleaning apparatus housing and the cylindrical sensor can be based on the sensor design. For example, the wiper housing may be affixed to a top surface of the cylindrical sensor, or a bottom surface, depending on the desired implementation. Once coupled to the cylindrical sensor, the wiper housing is configured to be rotated about a surface (e.g., an optical surface) of the cylindrical sensor.

As discussed above, rotation of the housing may be controlled by the same motor/driver that controls laser scanning of the cylindrical sensor, for example, in LiDAR implementations.

In step 404, a wiper blade is coupled to the housing. As discussed above with respect to FIG. 3, the wiper blade can be configured to be disposed at a downward angle relative to a top-surface of the cylindrical sensor/sensor housing. As such, a leading edge of the wiper blade, when rotated, is designed to push in a downward direction with respect to the optical surface of the cylindrical sensor.

In step 406, one or more nozzles are disposed within the wiper blade. Further to the example illustrated in FIG. 3, the nozzles can be fixed in a helical arrangement. In some aspects, the nozzles can be configured to apply compressed gas to a surface (e.g., an optical surface) of the cylindrical sensor. In other implementations, the nozzles may be configured to apply a liquid, such as water or another cleaning agent. It is understood that different numbers of nozzles may be implemented in the wiper blade, without departing from the scope of the disclosed technology.

Figure 4B:
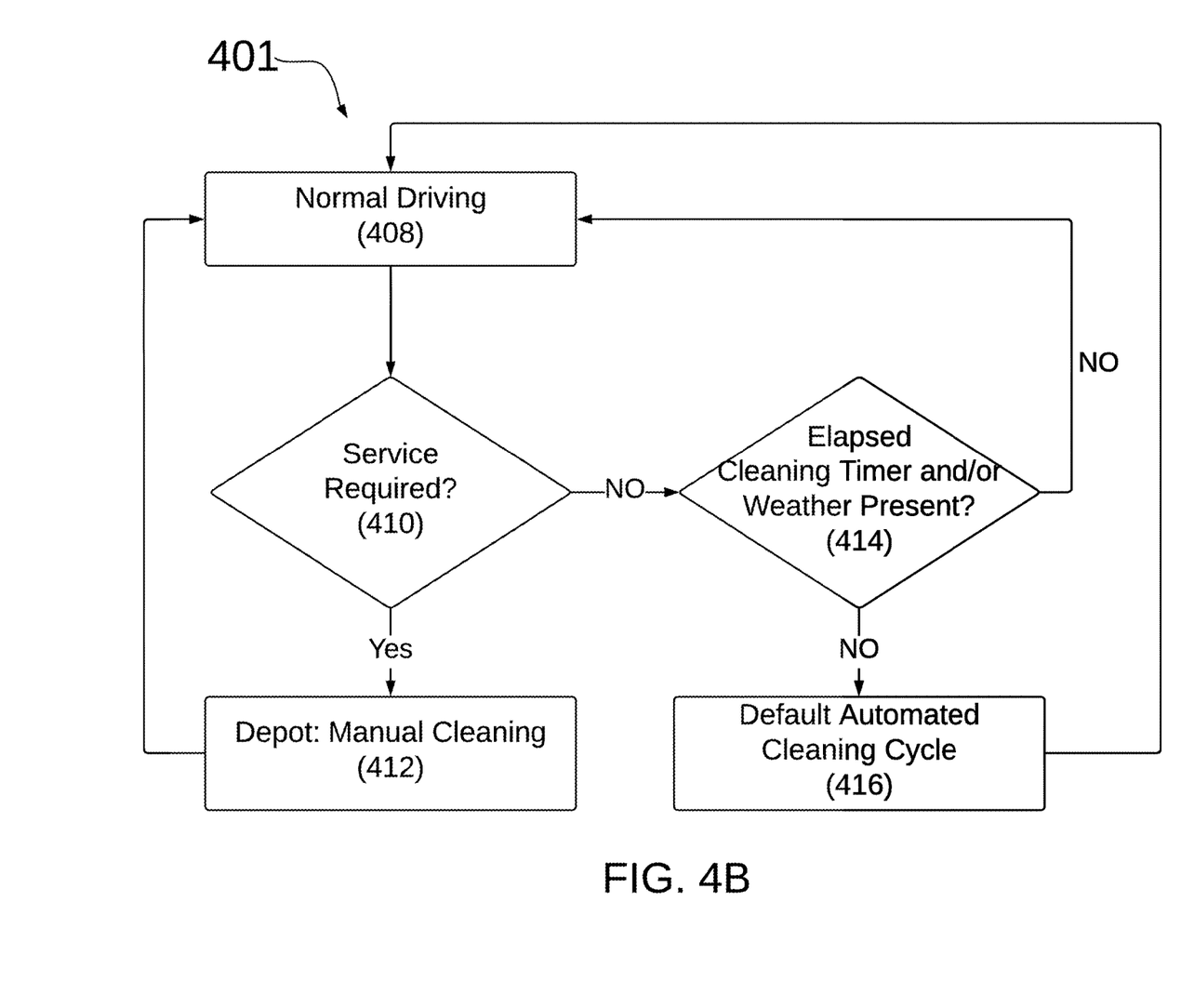
FIG. 4B illustrates steps of an example process for initiating a sensor operation, according to some aspects of the disclosed technology.

FIG. 4B illustrates steps of an example process 401 for initiating an AV sensor cleaning operation, according to some aspects of the disclosed technology. Process 401 begins with step 408, in which normal AV driving is commenced. Next, at step 410, it is determined whether AV service is required. If AV service is required, process 401 advances to step 412, and sensor cleaning is performed, for example, in conjunction with the needed AV servicing. For example, sensor cleaning may be performed manually at a depot, e.g., as part of routine AV maintenance. Alternatively, if no service is required in step 410, process 401 advances to step 414 in which it is determined if a time value associated with the cleaning timer has elapsed and/or if inclement weather is present. In some implementations, sensor cleaning may be performed at pre-determined time intervals counted by the cleaning timer. As such, sensor cleaning can be performed at regular intervals, based on the cleaning timer configuration. In such approaches, process 401 advances to step 416 and sensor cleaning is performed. Process 401 then reverts back to step 408 in which normal driving is commenced.

If at step 414 it is determined that inclement weather is present, for example, in which the sensor/s may be exposed to dirt, debris, and/or moisture that could affect operation, then process 401 proceeds to step 416 and sensor cleaning is performed. Depending on the desired implementation, weather or sensor debris may be detected using one or more of the AV's environmental sensors, or may be identified using data received from a remote source, such as a third-party weather reporting service.

Figure 5:
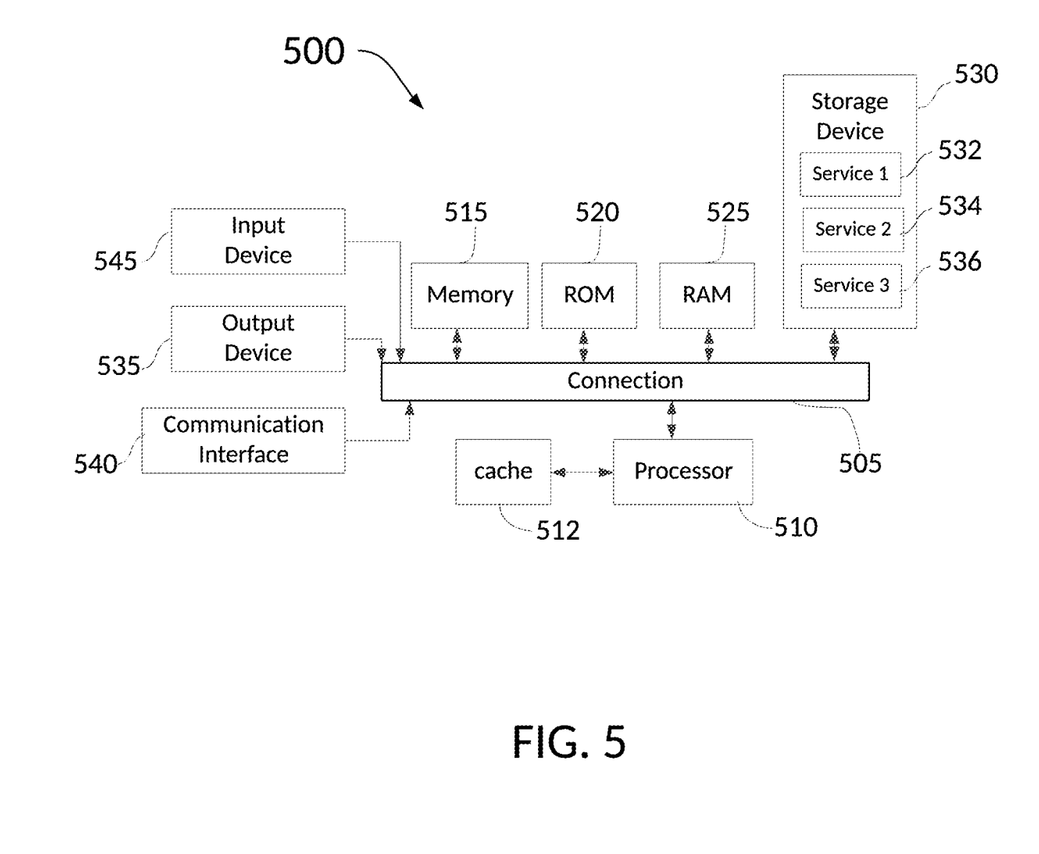
FIG. 5 illustrates an example processor-based system with which some aspects of the subject technology can be implemented.

FIG. 5 illustrates an example processor-based system with which some aspects of the subject technology can be implemented. For example, processor-based system 500 that can be any computing device making up internal computing system 110, remote computing system 150, a passenger device executing the rideshare app 170, internal computing device 130, or any component thereof in which the components of the system are in communication with each other using connection 505. Connection 505 can be a physical connection via a bus, or a direct connection into processor 510, such as in a chipset architecture. Connection 505 can also be a virtual connection, networked connection, or logical connection.

In some embodiments, computing system 500 is a distributed system in which the functions described in this disclosure can be distributed within a datacenter, multiple data centers, a peer network, etc. In some embodiments, one or more of the described system components represents many such components each performing some or all of the function for which the component is described. In some embodiments, the components can be physical or virtual devices.

Example system 500 includes at least one processing unit (CPU or processor) 510 and connection 505 that couples various system components including system memory 515, such as read-only memory (ROM) 520 and random-access memory (RAM) 525 to processor 510. Computing system 500 can include a cache of high-speed memory 512 connected directly with, in close proximity to, and/or integrated as part of processor 510.

Processor 510 can include any general-purpose processor and a hardware service or software service, such as services 532, 534, and 536 stored in storage device 530, configured to control processor 510 as well as a special-purpose processor where software instructions are incorporated into the actual processor design. Processor 510 may essentially be a completely self-contained computing system, containing multiple cores or processors, a bus, memory controller, cache, etc. A multi-core processor may be symmetric or asymmetric.

To enable user interaction, computing system 500 includes an input device 545, which can represent any number of input mechanisms, such as a microphone for speech, a touch-sensitive screen for gesture or graphical input, keyboard, mouse, motion input, speech, etc. Computing system 500 can also include output device 535, which can be one or more of a number of output mechanisms known to those of skill in the art. In some instances, multimodal systems can enable a user to provide multiple types of input/output to communicate with computing system 500. Computing system 500 can include communications interface 540, which can generally govern and manage the user input and system output. The communication interface may perform or facilitate receipt and/or transmission wired or wireless communications via wired and/or wireless transceivers, including those making use of an audio jack/plug, a microphone jack/plug, a universal serial bus (USB) port/plug, an Apple® Lightning® port/plug, an Ethernet port/plug, a fiber optic port/plug, a proprietary wired port/plug, a BLUETOOTH® wireless signal transfer, a BLUETOOTH® low energy (BLE) wireless signal transfer, an IBEACON® wireless signal transfer, a radio-frequency identification (RFID) wireless signal transfer, near-field communications (NFC) wireless signal transfer, dedicated short range communication (DSRC) wireless signal transfer, 802.11 Wi-Fi wireless signal transfer, wireless local area network (WLAN) signal transfer, Visible Light Communication (VLC), Worldwide Interoperability for Microwave Access (WiMAX), Infrared (IR) communication wireless signal transfer, Public Switched Telephone Network (PSTN) signal transfer, Integrated Services Digital Network (ISDN) signal transfer, 3G/4G/5G/LTE cellular data network wireless signal transfer, ad-hoc network signal transfer, radio wave signal transfer, microwave signal transfer, infrared signal transfer, visible light signal transfer, ultraviolet light signal transfer, wireless signal transfer along the electromagnetic spectrum, or some combination thereof.

Communications interface 540 may also include one or more Global Navigation Satellite System (GNSS) receivers or transceivers that are used to determine a location of the computing system 500 based on receipt of one or more signals from one or more satellites associated with one or more GNSS systems. GNSS systems include, but are not limited to, the US-based Global Positioning System (GPS), the Russia-based Global Navigation Satellite System (GLONASS), the China-based BeiDou Navigation Satellite System (BDS), and the Europe-based Galileo GNSS. There is no restriction on operating on any particular hardware arrangement, and therefore the basic features here may easily be substituted for improved hardware or firmware arrangements as they are developed.

Storage device 530 can be a non-volatile and/or non-transitory computer-readable memory device and can be a hard disk or other types of computer readable media which can store data that are accessible by a computer, such as magnetic cassettes, flash memory cards, solid state memory devices, digital versatile disks, cartridges, a floppy disk, a flexible disk, a hard disk, magnetic tape, a magnetic strip/stripe, any other magnetic storage medium, flash memory, memristor memory, any other solid-state memory, a compact disc read only memory (CD-ROM) optical disc, a rewritable compact disc (CD) optical disc, digital video disk (DVD) optical disc, a blu-ray disc (BDD) optical disc, a holographic optical disk, another optical medium, a secure digital (SD) card, a micro secure digital (microSD) card, a Memory Stick® card, a smartcard chip, a EMV chip, a subscriber identity module (SIM) card, a mini/micro/nano/pico SIM card, another integrated circuit (IC) chip/card, random access memory (RAM), static RAM (SRAM), dynamic RAM (DRAM), read-only memory (ROM), programmable read-only memory (PROM), erasable programmable read-only memory (EPROM), electrically erasable programmable read-only memory (EEPROM), flash EPROM (FLASHEPROM), cache memory (L1/L2/L3/L4/L5/L#), resistive random-access memory (RRAM/ReRAM), phase change memory (PCM), spin transfer torque RAM (STT-RAM), another memory chip or cartridge, and/or a combination thereof.

Storage device 530 can include software services, servers, services, etc., that when the code that defines such software is executed by the processor 510, it causes the system to perform a function. In some embodiments, a hardware service that performs a particular function can include the software component stored in a computer-readable medium in connection with the necessary hardware components, such as processor 510, connection 505, output device 535, etc., to carry out the function.

As understood by those of skill in the art, machine-learning based classification techniques can vary depending on the desired implementation. For example, machine-learning classification schemes can utilize one or more of the following, alone or in combination: hidden Markov models; recurrent neural networks; convolutional neural networks (CNNs); deep learning; Bayesian symbolic methods; general adversarial networks (GANs); support vector machines; image registration methods; applicable rule-based system. Where regression algorithms are used, they may include including but are not limited to: a Stochastic Gradient Descent Regressor, and/or a Passive Aggressive Regressor, etc.

Machine learning classification models can also be based on clustering algorithms (e.g., a Mini-batch K-means clustering algorithm), a recommendation algorithm (e.g., a Miniwise Hashing algorithm, or Euclidean Locality-Sensitive Hashing (LSH) algorithm), and/or an anomaly detection algorithm, such as a Local outlier factor. Additionally, machine-learning models can employ a dimensionality reduction approach, such as, one or more of: a Mini-batch Dictionary Learning algorithm, an Incremental Principal Component Analysis (PCA) algorithm, a Latent Dirichlet Allocation algorithm, and/or a Mini-batch K-means algorithm, etc.

Embodiments within the scope of the present disclosure may also include tangible and/or non-transitory computer-readable storage media or devices for carrying or having computer-executable instructions or data structures stored thereon. Such tangible computer-readable storage devices can be any available device that can be accessed by a general purpose or special purpose computer, including the functional design of any special purpose processor as described above. By way of example, and not limitation, such tangible computer-readable devices can include RAM, ROM, EEPROM, CD-ROM or other optical disk storage, magnetic disk storage or other magnetic storage devices, or any other device which can be used to carry or store desired program code in the form of computer-executable instructions, data structures, or processor chip design. When information or instructions are provided via a network or another communications connection (either hardwired, wireless, or combination thereof) to a computer, the computer properly views the connection as a computer-readable medium. Thus, any such connection is properly termed a computer-readable medium. Combinations of the above should also be included within the scope of the computer-readable storage devices.

Computer-executable instructions include, for example, instructions and data which cause a general purpose computer, special purpose computer, or special purpose processing device to perform a certain function or group of functions. By way of example computer-executable instructions can be used to implement perception system functionality for determining when sensor cleaning operations are needed or should begin. Computer-executable instructions also include program modules that are executed by computers in stand-alone or network environments. Generally, program modules include routines, programs, components, data structures, objects, and the functions inherent in the design of special-purpose processors, etc. that perform tasks or implement abstract data types. Computer-executable instructions, associated data structures, and program modules represent examples of the program code means for executing steps of the methods disclosed herein. The particular sequence of such executable instructions or associated data structures represents examples of corresponding acts for implementing the functions described in such steps.

Other embodiments of the disclosure may be practiced in network computing environments with many types of computer system configurations, including personal computers, hand-held devices, multi-processor systems, microprocessor-based or programmable consumer electronics, network PCs, minicomputers, mainframe computers, and the like. Embodiments may also be practiced in distributed computing environments where tasks are performed by local and remote processing devices that are linked (either by hardwired links, wireless links, or by a combination thereof) through a communications network. In a distributed computing environment, program modules can be located in both local and remote memory storage devices.

The various embodiments described above are provided by way of illustration only and should not be construed to limit the scope of the disclosure. For example, the principles herein apply equally to optimization as well as general improvements. Various modifications and changes may be made to the principles described herein without following the example embodiments and applications illustrated and described herein, and without departing from the spirit and scope of the disclosure. Claim language reciting "at least one of" a set indicates that one member of the set or multiple members of the set satisfy the claim.

What is claimed is:

1. A sensor cleaning apparatus, comprising:
a cylindrical wiper housing, wherein the cylindrical wiper housing is affixed to a top surface of a cylindrical optical sensor housing and is configured to rotate around a vertical center axis of the cylindrical optical sensor housing;
a wiper blade coupled to the cylindrical wiper housing; wherein the wiper blade extends around a cylindrical circumference and is disposed at a downward angle relative to the top surface of the cylindrical optical sensor housing by a plurality of supports that are spaced around the cylindrical wiper housing, each support extending vertically from a location on the cylindrical wiper housing to an attachment point along the wiper blade, along the cylindrical circumference; and
nozzles disposed within the wiper blade, wherein the nozzles are configured to apply compressed gas to a vertical side surface of the cylindrical optical sensor housing, and wherein the nozzles are positioned within the wiper blade at different positions along a vertical axis of the sensor cleaning apparatus such that a first nozzle is located closer to the top surface of the cylindrical optical sensor housing than all other nozzles and all the other nozzles are located at different relative distances from the top surface of the cylindrical optical sensor housing and along the vertical axis.

2. The sensor cleaning apparatus of claim 1, wherein the cylindrical optical sensor housing includes a rotatable optical sensor and wherein the wiper blade is configured to rotate at a substantially similar rotational frequency to the rotational frequency of the optical sensor.

3. The sensor cleaning apparatus of claim 1, wherein the wiper blade is configured to rotate at approximately 10 Hz.

4. The sensor cleaning apparatus of claim 2, wherein the optical sensor is a Light Detection and Ranging (LiDAR) sensor.

5. The sensor cleaning apparatus of claim 1, wherein the wiper blade is configured to rotate above the vertical side surface of the cylindrical optical sensor housing without contacting the vertical side surface of the cylindrical optical sensor housing.

6. The sensor cleaning apparatus of claim 1, wherein the wiper blade is configured to contact the vertical side surface of the cylindrical optical sensor housing.

7. An autonomous vehicle (AV), comprising:
at least one self-cleaning sensor, wherein the at least one self-cleaning sensor comprises:
an optical sensor having a cylindrical optical sensor housing;
a cylindrical wiper housing, wherein the cylindrical wiper housing is affixed to a top surface of the cylindrical optical sensor housing and is configured t rotate around a vertical center axis of the cylindrical optical sensor housing;
a wiper blade coupled to the cylindrical wiper housing, wherein the wiper blade extends around a cylindrical circumference and is disposed at a downward angle relative to the top surface of the cylindrical optical sensor housing by a plurality of supports that are spaced around the cylindrical wiper housing, each support extending vertically from a location on the cylindrical wiper housing to an attachment point along the wiper blade, along the cylindrical circumference; and
nozzles disposed within the wiper blade, wherein the nozzles are configured to apply compressed gas to a vertical side surface of the cylindrical optical sensor housing, and wherein the nozzles are positioned within the wiper blade at different positions along a vertical axis of the at least one self-cleaning sensor such that a first nozzle is located closer to the top surface of the cylindrical optical sensor housing than all other nozzles and all the other nozzles are located at different relative distances from the top surface of the cylindrical optical sensor housing and along the vertical axis.

8. The AV of claim 7, wherein the at least one self-cleaning sensor further comprises a first motor configured to rotate the optical sensor, and a second motor configured to rotate the wiper blade at a substantially similar rotational frequency to the rotational frequency of the optical sensor.

9. The AV of claim 7, wherein the wiper blade is configured to rotate at a substantially similar rotational frequency to the rotational frequency of the optical sensor.

10. The AV of claim 7, wherein the wiper blade is configured to rotate at approximately 10 Hz.

11. The AV of claim 7, wherein the optical sensor is a Light Detection and Ranging (LiDAR) sensor.

12. The AV of claim 7, wherein the wiper blade is configured to rotate above the vertical side surface of the cylindrical optical sensor housing without contacting the vertical side surface of the cylindrical optical sensor housing.

13. The AV of claim 7, wherein the wiper blade is configured to contact the vertical side surface of the cylindrical optical sensor housing.

14. A method of constructing a self-cleaning sensor, the method comprising:
coupling a cylindrical wiper housing to a top surface of a cylindrical optical sensor housing of an optical sensor, wherein the cylindrical wiper housing is configured to rotate around a vertical center axis of the cylindrical optical sensor housing;
coupling a wiper blade to the cylindrical wiper housing, wherein the wiper blade extends around a cylindrical circumference and is disposed at a downward angle relative to the top surface of the cylindrical optical sensor housing by attaching a plurality of supports around the cylindrical wiper housing and extending each support vertically from a location on the cylindrical wiper housing to an attachment point along the wiper blade, along the cylindrical circumference; and
disposing nozzles within the wiper blade, wherein the nozzles are configured to apply compressed gas to a vertical side surface of the cylindrical optical sensor housing, and wherein the nozzles are positioned within the wiper blade at different positions along a vertical axis of the self-cleaning sensor such that a first nozzle is located closer to the top surface of the cylindrical optical sensor housing than all other nozzles and all the other nozzles are located at different relative distances from the top surface of the cylindrical optical sensor housing and along the vertical axis.

15. The method of claim 14, wherein the optical sensor is rotatable and the wiper blade is configured to rotate ata substantially similar rotational frequency to the rotational frequency of the optical sensor.

16. The method of claim 14, wherein the wiper blade is configured to rotate at approximately 10 Hz.

17. The method of claim 14, wherein the optical sensor is a Light Detection and Ranging (LiDAR) sensor.

18. The method of claim 14, wherein the wiper blade is configured to rotate above the vertical side surface of the cylindrical optical sensor housing without contacting the vertical side surface of the cylindrical optical sensor housing.

19. The method of claim 14, wherein coupling the cylindrical wiper housing to the cylindrical optical sensor comprises affixing the cylindrical wiper housing around the top surface of the cylindrical optical sensor housing.

20. The method of claim 14, wherein the wiper blade is configured to contact the vertical side surface of the cylindrical optical sensor housing.

* * * * *